Aug. 15, 1950　　　J. D. DANFORTH　　　2,518,528
PRODUCTION OF ALIPHATIC AMINES
Filed Oct. 15, 1947
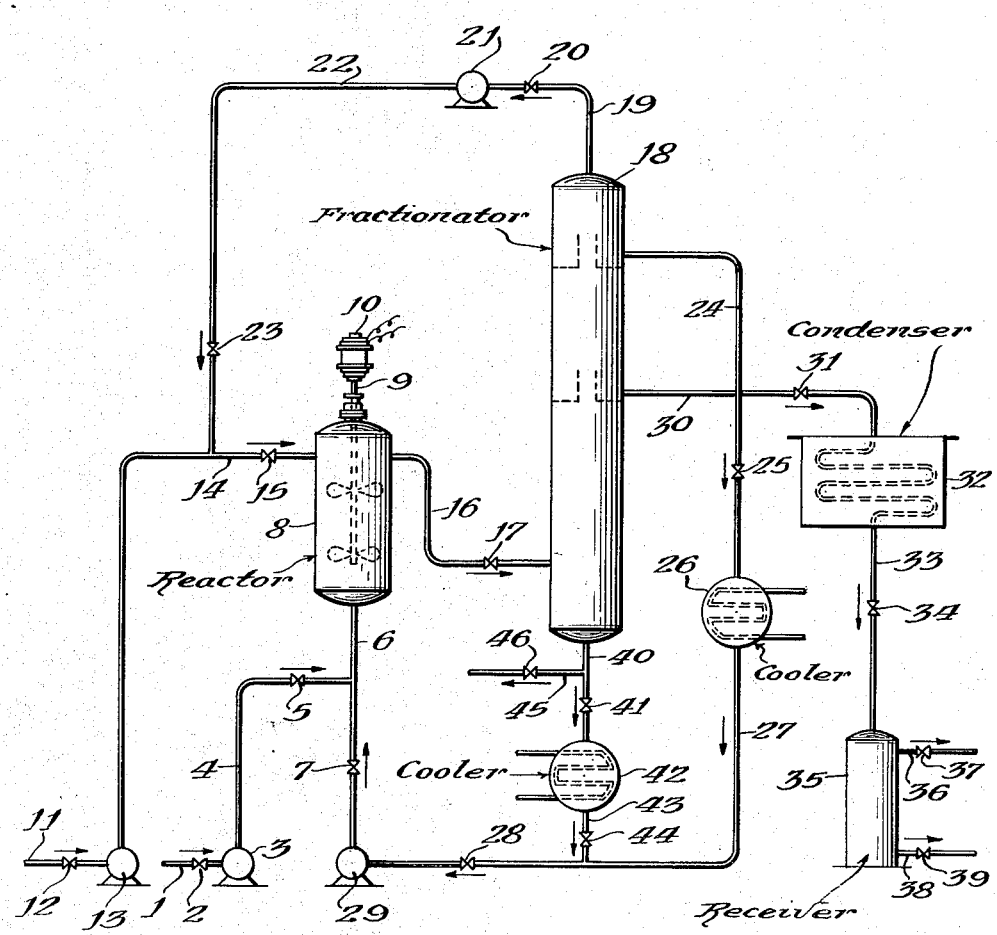
INVENTOR.
Joseph D. Danforth
BY Maynard P. Venema
Attorney
Raymond E. Schaad,
Agent Patented Aug. 15, 1950

2,518,528

UNITED STATES PATENT OFFICE 2,518,528

PRODUCTION OF ALIPHATIC AMINES

Joseph D. Danforth, Grinnell, Iowa, assignor to Universal Oil Products Company, Chicago, Ill., a corporation of Delaware Application October 15, 1947, Serial No. 779,976

14 Claims. (Cl. 260—583)

This application is a continuation-in-part of my co-pending application Serial No. 538,191, filed May 31, 1944, and now abandoned.

This invention relates to a process for preparing aliphatic amines containing an alkapolyenyl group of at least eight carbon atoms. More specifically, the process is concerned with the production of aliphatic amines having at least one alkapolyenyl group containing from 8 to about 20 carbon atoms.

An object of this invention is the production of an aliphatic amine containing an alkapolyenyl group of at least eight carbon atoms.

Another object of this invention is the production of an alkyl alkenyl alkapolyenyl amine.

Still another object of this invention is the production of an alkyl dialkapolyenyl amine.

A further object of this invention is the production of an alkyl butenyl octadienyl amine.

A still further object of this invention is the production of butyl dioctadienyl amine.

One specific embodiment of this invention relates to a process for producing an aliphatic amine containing an alkapolyenyl group of at least eight carbon atoms which comprises reacting one molecular proportion of an aliphatic amine having hydrogen combined with nitrogen and at least two molecular proportions of a conjugated alkadiene in the presence of an alkali metal catalyst.

Another embodiment of this invention relates to a process for producing an aliphatic amine containing an alkapolyenyl group of at least 8 carbon atoms which comprises reacting a primary aliphatic amine selected from the group consisting of a monoalkyl amine and a monoalkenyl amine with at least two molecular proportions of a conjugated alkadiene in contact with an alkali metal catalyst.

Still another embodiment of this invention relates to a process for producing an alkyl alkapolyenyl amine in which the alkapolyenyl group contains from 8 to 20 carbon atoms which comprises reacting a monoalkyl amine with at least two molecular proportions of butadiene-1,3 in contact with an alkali metal catalyst.

A further embodiment of this invention relates to a process for producing an alkyl butenyl octadienyl amine which comprises reacting a monoalkyl amine with at least two molecular proportions of butadiene-1,3 in contact with an alkali metal catalyst comprising essentially the reaction product of said monoalkyl amine and alkali metal.

I have found that an alkali metal and also the reaction product of an alkali metal and a monoalkyl amine or monoalkenyl amine are active catalysts for the production of an amine containing an alkapolyenyl group. The process involves the condensation of such a monoaliphatic amine and a conjugated alkadiene, in the presence of the mentioned catalyst.

Monoaliphatic amines used as starting materials in my process have the general formula $RNH_2$ wherein R represents a member of the group consisting of an alkyl group and an alkenyl group.

Alkadienes utilized in my process comprise particularly the conjugated alkadienes including butadiene-1,3, isoprene, piperylene, conjugated hexadiene, and other alkadienes of higher molecular weight. Butadiene-1,3 is a particularly useful conjugated diolefin for this process as it is readily available in a high degree of purity and reacts with a monoalkyl amine or monoalkenyl amine to form higher boiling amines containing an alkapolyenyl group of at least eight carbon atoms such as an octadienyl group, a dodecatrienyl group, a hexadecatetraenyl group, etc., in which the alkapolyenyl group contains at least two double bonds and has from 8 to 20 carbon atoms. In this process, reaction products may be formed containing one, two or three alkapolyenyl groups. An important product of the process contains one each of an alkyl, an alkenyl, and an alkapolyenyl group, the latter having at least 8 carbon atoms. An example of such a compound is butyl butenyl octadienyl amine which is formed by the reaction of monobutyl amine with butadiene-1,3 as illustrated by the following equation:

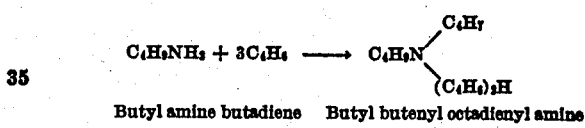

Butyl amine   butadiene    Butyl butenyl octadienyl amine

The structure of the butyl butenyl octadienyl amine may be represented by the following formula:

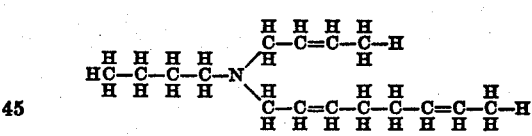

However, the double bonds of the butenyl and octadienyl groups may be at other positions in these groups. Similarly, a monoalkyl amine may react with more of the conjugated diolefin to form an alkyl di(alkadienyl amine), an alkyl di(alkatrienyl) amine, an alkyl di(alkatetrenyl)- amine, and an alkyl di(alkapentenyl) amine. Another more unsaturated reaction product is formed when a monoalkenyl amine is reacted with a conjugated alkadiene in the presence of one or more of the mentioned alkali metal catalysts. Such a condensation reaction is illustrated by the following equation which represents the reaction of butenyl amine with butadiene-1,3 in the presence of butenyl amine sodium reaction product, namely,

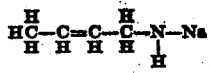

or the corresponding potassium compound:

$CH_3-CH=CH-CH_2-NH_2 + 3CH_2=CH-CH=CH_2 \longrightarrow$
Butenyl amine      Butadiene-1,3

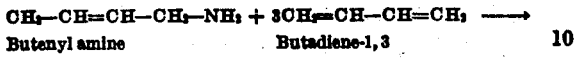
Dibutenyl octadienyl amine

Also the condensation of one molecular proportion of the butenyl amine with four molecular proportions of butadiene-1,3 may form butenyl dodecatrienyl amine. The general reaction in which these and higher molecular proportions of butadiene are condensed with butenyl amine may be represented by the general equation:

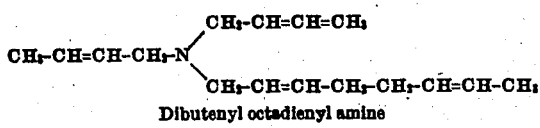

Also the condensation of a monoalkenyl amine with butadiene may be represented by an equation in which R—CH=CH— represents an alkenyl group:

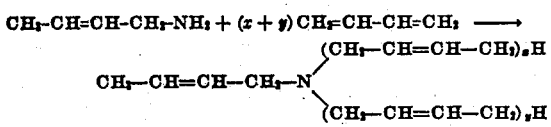

Similarly, the condensation of a monoalkyl amine and a conjugated diolefin may be indicated by the following equation in which butadiene-1,3 is shown as a typical diolefin and R represents an alkyl group:

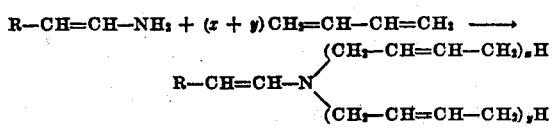

Reaction products formed from the simplest monoalkyl amine, methyl amine, and butadiene are shown in the following equations:

$CH_3NH_2 + 3CH_2=CH-CH=CH_2 \longrightarrow$
Methyl amine     Butadiene

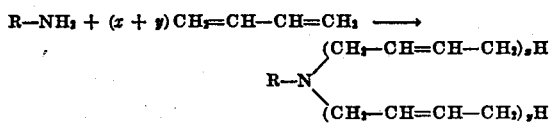
Methyl butenyl octadienyl amine $CH_3NH_2 + 4CH_2=CH-CH=CH_2 \longrightarrow$

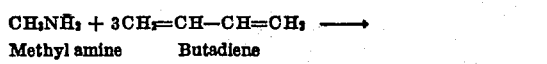
N-dioctadienyl methyl amine

A dialkyl amine or a polyalkylene-polyamine may also be reacted with a conjugated alkadiene such as butadiene and the like to produce amines of higher molecular weight containing an alkapolyenyl group of at least 8 carbon atoms. The following equation represents such a reaction with a dialkyl amine, namely dimethyl amine,

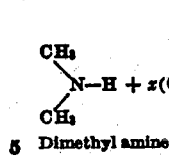 + $x(CH_2=CH-CH=CH_2) \longrightarrow$
Dimethyl amine     Butadiene-1,3

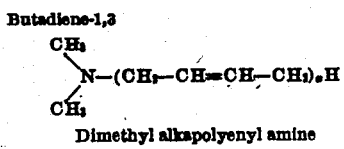
Dimethyl alkapolyenyl amine

In this equation $x$ is an integer from 2 to about 5.

Reaction of a polyalkylene polyamine with a conjugated alkadiene is illustrated by the following equation in which $x$ is an integer from 3 to 5.

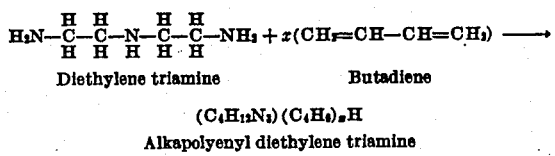
Diethylene triamine     Butadiene $(C_4H_{12}N_3)(C_4H_6)_xH$
Alkapolyenyl diethylene triamine Each of the mono-alkyl amines, mono-alkenyl amines, dialkyl amines, dialkenyl amines, mono-alkyl-mono-alkenyl amines, and polyalkylene-polyamines has a hydrogen atom combined with a nitrogen atom of an amine group and is capable of reacting with two or more molecular proportions of a conjugated alkadiene to form an aliphatic amine of higher molecular weight containing an alkapolyenyl group. Of these different aliphatic amines, the mono-alkyl and mono-alkenyl amines are preferred for this process.

In carrying out the process of this invention a conjugated alkadiene (such as butadiene) is placed in a suitable pressure vessel equipped with adequate cooling means for dispersing exothermic heat of the reaction and an aliphatic amine and a suspension of an alkali metal or a solution or suspension of an alkali metal salt of an aliphatic amine are then charged to the autoclave containing the alkali while maintaining the temperature of the reaction mixture at from about 0° to about 150° C., and preferably at from about 20° to about 60° C. In this treatment, at least two molecular proportions of the alkadiene are present per molecular proportion of monoaliphatic amine introduced thereto, while a pressure is maintained sufficient to effect the condensation of the aliphatic amine and alkadiene to form a higher boiling aliphatic amine containing at least one alkapolyenyl group having at least eight carbon atoms. The alkapolyenyl group preferably contains from 8 to 20 carbon atoms, and may have from 2 to about 5 double bonds.

Although an alkali metal serves as a catalyst for this reaction, it is preferable to use an alkali metal catalyst formed in situ by reacting an alkali metal with an aliphatic amine. When the catalyst is prepared separately before the beginning of the condensation run, metallic sodium or potassium is added to the aliphatic amine contained in a 3-neck flask or other suitable reactor and is brought to a reaction temperature of from 100° to about 130° C. After the alkali metal has become molten, the reaction mixture is stirred vigorously and gaseous butadiene is bubbled slowly into the reaction mixture. For example, the alkali metal salt of a mono-aliphatic amine is formed according to the following equation:

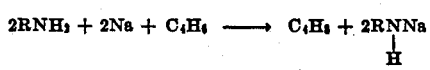

The products of this reaction containing the sodium salt of the monoalkyl amine, RNH₂, and the excess of the monoaliphatic amine charged to the process is used directly or the solution is cooled and the amine solution is decanted from the solid alkali metal amine salt. The recovered alkali metal amine salt is added as the catalyst for the condensation of a monoalkyl amine or a monoalkenyl amine with an alkadiene.

In an alternative preparation of the catalyst in situ, the alkali metal is mixed with the monoaliphatic amine, the temperature of the mixture is brought above the melting point of the alkali metal and then stirring is started. When the mixture is thoroughly stirred and the alkali metal is dispersed in the amine, for example, by means of a turbo mixer, a relatively small charge of a diolefin such as butadiene is added to the mixture. The reaction shown above proceeds to form the alkali amine solution in situ. The temperature of the reaction mixture is then lowered and a conjugated alkadiene and aliphatic amine are added gradually to bring about the desired condensation reaction of the amine and the alkadiene.

My process is illustrated further by the attached drawing which shows diagrammatically one form of apparatus in which it may be effected. For the sake of simplifying the description, it will deal with an apparatus used for condensing n-butyl amine and butadiene-1,3 to produce n-butyl-butenyl octadienyl amine.

A mixture of n-butyl amine and the sodium salt of n-butyl amine are introduced through line 1 to valve 2 to pump 3 which discharges through line 4 and valve 5 into line 6 and thence through valve 7 to reactor 8 provided with stirring device 9 operated by prime mover 10. Butadiene-1,3 from an outside source is introduced through line 11 and valve 12 to pump or compressor 13 which discharges through line 14 and valve 15 into the upper portion of reactor 8. Although not so illustrated in the drawing, reactor 8 may also be provided with cooling or heating means such as a jacket through which a fluid may be circulated at a desired temperature.

After the mixture of butadiene-1,3, n-butyl amine and the sodium salt of the latter are contacted in reactor 8, a portion of this mixture is discharged therefrom through line 16 and valve 17 to fractionator 18 of suitable design in which the reaction products may be separated preferably at a subatmospheric pressure. Unconverted butadiene is directed from the top of fractionator 18 through line 19 and valve 20 to compressor 21 which discharges through line 22 and valve 23 into line 14, already mentioned, through which the fresh charge of butadiene is directed to reactor 8. If more convenient, the butadiene being discharged through line 19 may be passed through a cooler to liquefy it so that the liquid diolefin may then be recycled to line 14 by means of a pump not illustrated in the diagrammatic drawing. When the butadiene fraction charged to the process contains small amounts of other gases, particularly butanes and butylenes, a portion of the material being passed through line 19 is withdrawn therefrom by means not illustrated in the drawing.

When butadiene and n-butyl amine are thus reacted in the presence of sodium, unconverted n-butyl amine and also n-butyl butenyl amine and n-butyl dibutenyl amine formed in the process are withdrawn from fractionator 18 through line 24, and valve 25 to cooler 26 from whence the liquefied mixture of amines is directed through line 27 and valve 28 to pump 29 which discharges through line 6 and valve 7 aforementioned into reactor 8. If desired, a portion of the mixture of unconverted n-butyl amine, and n-butyl butenyl amine and n-butyl dibutenyl amine may be directed from line 27 to storage or it may be conducted to near the top of fractionator 18, by means not illustrated in the diagrammatic drawing to serve as reflux liquid and thus to assist in controlling the temperature within fractionator 18.

n-Butyl butenyl octadienyl amine, which is a desired product of the process when using the aforementioned starting materials, is withdrawn from fractionator 18, through line 30, valve 31, condenser 32, rundown line 33 and valve 34 to receiver 35 provided with conventional gas release line 36 containing valve 37 and with liquid drawoff line 38 containing valve 39.

Near the bottom of fractionator 18, a mixture of the sodium salt of n-butylamine, a portion of the n-butyl butenyl alkadienyl amines and higher boiling products of the process are withdrawn through line 40 and valve 41, cooler 42 and line 43 containing valve 44 to line 27 aforementioned, and recycled to reactor 8. When desired, all or a portion of the mixture that is being directed through line 40 may be discharged therefrom through branch line 45 and valve 46 to waste, storage, or other use not illustrated in the diagrammatic drawing.

The following examples are given to illustrate the process of this invention although with no intention of unduly limiting its generally broad scope.

*Example I*

The sodium salt of methyl amine was prepared in a turbo mixer by slowly adding approximately 0.5 mole of butadiene-1,3 to a stirred mixture of 2.35 molecular proportions of methyl amine and 0.45 molecular proportion of sodium maintained at a temperature of 104° C. After the 0.5 molecular proportion of butadiene had been added and the sodium had been converted into sodium methyl amine, the resultant mixture was cooled to 52° C. and then mixed with 5.5 molecular proportions of butadiene during a time of 3 hours while the stirring was continued and the reaction temperature was maintained between 38° and 71° C. The resultant liquid product consisted of 56% by weight of methyl butenyl octadienyl amine and 33.4% by weight of methyl dibutenyl amine.

*Example II*

Two molecular proportions of n-butyl amine and 0.5 molecular proportion of metallic sodium were heated at 104° C. in a turbomixer and 0.55 molecular proportion of butadiene was introduced to the stirred mixture. After this quantity of butadiene had been added, the mixture was cooled to 60° C. and commingled with 7.3 molecular proportions of butadiene over a period of 3 hours during which the temperature was maintained between 52° and 74° C. The resultant mixture was then stirred for 16 hours, at 25° C., and the products were then separated into 1.6 moles of a C₄ hydrocarbon fraction and 473 grams of a stabilized liquid. Extraction of the liquid product with dilute acetic acid separated 159 grams of acid-soluble amines from 271 grams of acid-insoluble material, the latter consisting essentially of n-butyl butenyl octadienyl amine. The acid-soluble amines contained about 77% of n-butyl dibutenyl amine admixed with unconverted n-butyl amine.

*Example III*

A mixture of one molecular proportion of isopropyl amine and four molecular proportions of butadiene reacted at a temperature of 60° C. in the presence of sodium isopropyl amine forming a substantial yield of an aliphatic amine boiling at 113° C. at a pressure of 10 mm. of mercury. This material was shown to be a tertiary aliphatic amine, that is an amine in which three aliphatic groups are combined with a nitrogen atom, these groups being an isopropyl group, a butenyl group, and an octadienyl group. By analysis, the product was found to contain 81.26% carbon, 12.44% hydrogen, and 6.18% nitrogen in good agreement with the theoretical values of 81.37% carbon, 12.30% hydrogen, and 6.33% nitrogen calculated for isopropyl butenyl octadienyl amine.

By using the Lorentz equation for molecular refraction which has been found to check closely on a number of unsaturated amines of known structure, the following structure is indicated for the obtained reaction product:

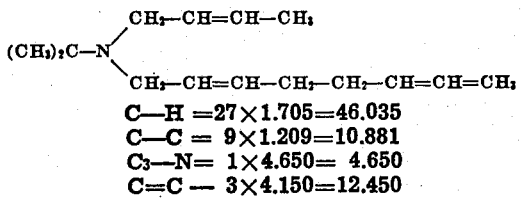

$$C-H = 27 \times 1.705 = 46.035$$
$$C-C = 9 \times 1.209 = 10.881$$
$$C_3-N = 1 \times 4.650 = 4.650$$
$$C=C = 3 \times 4.150 = 12.450$$

Molecular refraction = 74.016

Calculation of refraction from the measured $n_D^{20}$ of 1.4605 and the gravity of 0.8209 using the standard equation gave a value of 73.93 which is an excellent check with that calculated from the proposed structure.

The alkyl alkenyl alkapolyenyl amines which are formed in this process are useful as plasticizers, insecticides, germicides, flotation agents, modifiers of drying oils by copolymerizing with drying oils, and as softening agents for reclaiming rubber.

I claim as my invention:

1. A process for producing an aliphatic amine containing an alkapolyenyl group of at least eight carbon atoms which comprises reacting one molecular proportion of an aliphatic amine consisting of carbon, hydrogen and nitrogen and having hydrogen combined with nitrogen and at least two molecular proportions of a conjugated alkadiene in the presence of an alkali metal catalyst at a temperature of from about 0° C. to about 150° C.

2. A process for producing an aliphatic amine containing an alkapolyenyl group of at least eight carbon atoms which comprises reacting one molecular proportion of an alkyl amine consisting of carbon, hydrogen and nitrogen and having hydrogen combined with nitrogen and at least two molecular proportions of a conjugated alkadiene in the presence of an alkali metal catalyst at a temperature of from about 0° C. to about 150° C.

3. A process for producing an aliphatic amine containing an alkapolyenyl group of at least eight carbon atoms which comprises reacting one molecular proportion of an alkenyl amine consisting of carbon, hydrogen and nitrogen and having hydrogen combined with nitrogen and at least two molecular proportions of a conjugated alkadiene in the presence of an alkali metal catalyst at a temperature of from about 0° C. to about 150° C.

4. A process for producing an aliphatic amine containing an alkapolyenyl group of at least eight carbon atoms which comprises reacting one molecular proportion of a polyalkylene polyamine consisting of carbon, hydrogen and nitrogen and having hydrogen combined with nitrogen and at least two molecular proportions of a conjugated alkadiene in the presence of an alkali metal catalyst at a temperature of from about 0° C. to about 150° C.

5. A process for producing an alkyl alkapolyenyl amine in which the alkapolyenyl group contains from 8 to 20 carbons atoms which comprises reacting a monoalkylamine with at least two molecular proportions of butadiene-1,3 in contact with an alkali metal catalyst at a temperature of from about 0° to about 150° C.

6. A process for producing an alkyl alkapolyenyl amine in which the alkapolyenyl group contains from 8 to 20 carbon atoms which comprises reacting a monoalkenyl amine with at least two molecular proportions of butadiene-1,3 in contact with an alkali metal catalyst at a temperature of from about 0° to about 150° C.

7. A process for producing methyl butenyl octadienyl amine which comprises reacting monomethyl amine with at least three molecular proportions of butadiene-1,3 at a temperature of from about 0° to about 150° C. in contact with the reaction product of methyl amine and an alkali metal.

8. A process for producing isopropyl butenyl octadienyl amine which comprises reacting isopropyl amine with at least three molecular proportions of butadiene-1,3 at a temperature of from about 0° to about 150° C. in contact with the reaction product of isopropyl amine and an alkali metal.

9. A process for producing n-butyl butenyl octadienyl amine which comprises reacting mono-n-butyl amine with at least three molecular proportions of butadiene-1,3 at a temperature of from about 0° to about 150° C. in contact with the reaction product of n-butyl amine and an alkali metal.

10. The process as defined in claim 1 further characterized in that said alkali metal catalyst is metallic sodium.

11. The process as defined in claim 1 further characterized in that said alkali metal catalyst is metallic potassium.

12. The process as defined in claim 1 further characterized in that said alkali metal catalyst is the reaction product of said aliphatic amine and sodium.

13. The process as defined in claim 5 further characterized in that said alkali metal catalyst is metallic sodium.

14. The process as defined in claim 6 further characterized in that said alkali metal catalyst is metallic sodium.

JOSEPH D. DANFORTH.

REFERENCES CITED

The following references are of record in the file of this patent:

FOREIGN PATENTS

| Number | Country | Date |
|---|---|---|
| 496,280 | Germany | Apr. 15, 1930 |

OTHER REFERENCES

Forster et al., "J. Chem. Soc." (London) vol. 103, 1338–1346 (1913).

Mannich et al., Ber. deut. chem.," vol. 69, 2112–2123 (1935).